United States Patent [19]

Pugh

[11] 4,451,877
[45] May 29, 1984

[54] BATTERY SYSTEM

[76] Inventor: Paul F. Pugh, 4082 Sequoyah Rd., Oakland, Calif. 94605

[21] Appl. No.: 300,798

[22] Filed: Sep. 10, 1981

[51] Int. Cl.³ .............................................. H02M 3/18
[52] U.S. Cl. ..................................................... 363/59
[58] Field of Search .................... 307/109, 110; 321/1, 321/3, 57, 59

[56] References Cited

U.S. PATENT DOCUMENTS 2,014,219 9/1935 Allibone .......................... 307/110 X
2,943,255 6/1960 Du Fresne et al. ...................... 320/1

Primary Examiner—William M. Shoop

[57] ABSTRACT

A new, small, light weight, low cost, electric battery system stores the energy in an electric field at a very high DC voltage in a condenser that has a very high dielectric constant. Present condensers are not competitive for battery use because the voltage is not high enough, the dielectric constant is not high enough, and a system is not available for reducing the space and cost of the accessories such as transformers, rectifiers, and switches.

The new battery system has the potential for storing electric energy at a first cost of $5.00 per KW, with a weight of 4.4 pounds per KW, and in a space of 38 KW per cubic foot.

9 Claims, 1 Drawing Figure

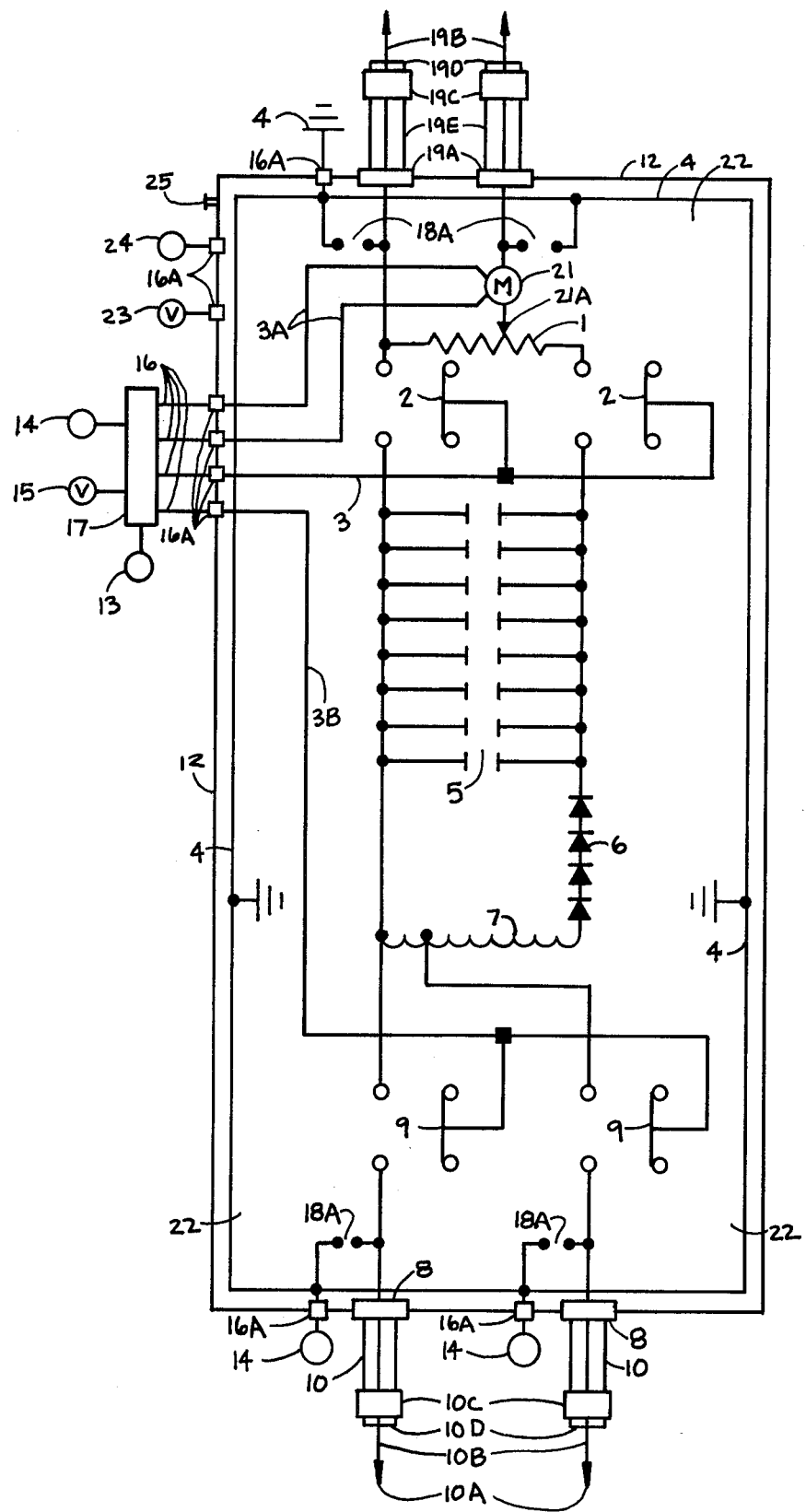

BATTERY SYSTEM

BACKGROUND OF THE INVENTION

The new battery system relates to a high voltage direct current (DC) system with inputs, outputs, and accessories within a 100 psig or higher pressurized $SF_6$ gas non-metallic, shielded tank. The unit is small, light in weight and suitable for recharging within 5 hours from a 230 volt at 100 amperes. The system would have an infinite recharging life.

The present state of the art and future energy storage systems listed by the U.S. Department of Energy do not mention electrical field energy storage. The new system is innovative. Direct current capacitors now used are for a fast discharge or for limited storage capacity. The new battery system has the potential to exceed goals now being considered for battery research and development.

High voltage capacitors require costly bushings and space. Bushings and extra installation costs are eliminated by placing the high voltage components in a gas pressurized tank. Space is reduced. To equal the performance of the new system with commercially available DC condensers, over 1,000 times more space would be required compared to the new system and the cost would be excessive.

To illustrate the nw methods and technology for the new battery, or energy storage system, the following calculations and examples are offered. The energy stored in a condenser can be calculated as follows.

$$W \text{ (energy in watt-sec or joules)} = 0.5 \, V^2 C$$

$V$ — Volts between plates
$C$ — Capacitance in Farads between plates $$W \text{ (KWH) (KiloWatt-hours)} = \frac{0.5 \, V^2 C \times 10^{-3}}{60 \times 60}$$

$$= 0.1389 \times 10^{-6} \, V^2 C$$

$$C \text{ (farads)} = \frac{8.85 \times 10^{-14} \times k \times A \times N}{L}$$

$k$ — Dielectric constant of medium between plates
$A$ — Area of the surface of the medium between plates in centimeters squared.
$N$ — Number of pairs of plates or dielectric mediums.
$L$ — Separation of the plates in centimeters $$W \text{ (KWH)} = \frac{1.229 \times 10^{-20} \, V^2 k A N}{L}$$

Capacitors (C) in parallel add together. If $C_1$ and $C_2$ are two capacitors in parallel, the total capacitance is $C_t = C_1 + C_2$. This is the basis for the multiplier "N" above for a stack of parallel plates with dielectrics in between.

The new battery would have a theoretical rating of 12,000 volts per thousandths of an inch (mil) working stress and a dielectric constant medium of 8,000. Higher voltage stresses are possible in solids, liquids, and gases for DC voltages than for alternating current (AC) voltages because corona and dielectric losses can be eliminated. The highest operating stress used in commercial capacitors is 1,000 volts per mil with thin films of polyethylene or polyester in a high dielectric constant insulating oil.

Corona can be produced with a DC field by a temperature variation. The voltage is distributed by the resistance of medium which changes under heating and cooling. To prevent temperature variation of more than a few degrees, low-loss components and a thermally insulated system (nonmetallic tank) are used in the new system.

To obtain the higher dielectric constant material, a compounded inorganic paint is applied to the plates in multiple thin layers in a manner similar to that used for coating a magnet wire with a thin film. Under a DC field, the dielectric constant is very high.

Titanates have a dielectric constant as high as 12,000. Calcium compounds of titanium have an estimated DC dielectric strength in $SF_6$ gas at 100 psig, in thin walls, and with high purity, of 21,210 volts per mil.

The dielectric constant of most commercial capacitors are 8 to 10 except for special applications. When a high dielectric constant material is placed in series with a low dielectric constant material, such as a gas (k=1), and with different insulation resistance (IR) values, the voltage stressing will be in relationship to 'k' values under AC and 'IR' values under DC. The change in 'IR' with temperature is an important factor. The gas spaces in the insulation are pressurized for a high breakdown voltage.

To make a low cost and small size, high capacity capacitor battery system, all of the components are important. The plate portion of an AC condenser rated 400 MVAR at 345 KV is only 2% of the total space. By factory-building the new battery system, the plates become the major space. The condenser plates, the leads, rectifiers, switches, transformer, voltage divider, voltage controls, and over-voltage protectors are all placed within the 100 psig or higher $SF_6$ gas tank. The rectifiers are low-loss and sized to operate at a low temperature. The materials are low cost and light weight such as polyethylene, aluminum, paper and an insulating gas. The switches, mounted in the tank, are operated in the $SF_6$ gas and are controlled externally by pressurized air for economy, reliability and safety. The output voltage is adjusted and controlled by an air operated motor in the gas tank.

Necessary gauges and air pressure controls are used to monitor the system. They are built into the tank with external connections to the tank. The tank is made of high density and high molecular polyethylene. The external electrical leads and compressed air leads are plastic with welds at seals to the tank. The compressed air leads are made of the same material as the tank which permits ease of fusion. The electric leads are made of tubes or pipes of the same material as the tank with solid copper or aluminum conductors. The tubes are fused to the tank and are clamped to the solid conductors with a rubber tubing seal between the plastic pipe and the solid conductor.

A single winding transformer is made from aluminum wires wrapped with crepe paper with an air core for light weight or a commercial auto-transformer is used.

The $SF_6$ gas pressure serves to insulate the condenser plates, the internal leads, and the transformer. A crepe paper spacer, continuous, is used to separate parts. All aluminum connections are compressed with a conducting epoxy sealant over the aluminum.

The tank that contains the high voltage battery is grounded and has internal arc gaps grounded to the tank's internal conducting surface. The non-metallic and insulating tank has a conducting coating inside which is grounded.

High pressure air is used for both high and low voltage switching operations. The pressurized gas and air tubes are both insulating. Any contaminates from the switches are mixed with the $SF_6$ or an insulating gas. The purity of the $SF_6$ gas can be checked during charging. It can be cleaned or replaced. A high purity gas is required to prevent flotation of conducting particles and electrical breakdown.

To illustrate the energy storage capacity of the new battery system, assume a box of plates, $2'\times2'\times2'$, with 0.001" thick aluminum plates or foil. The size is optimized for all desired needs such as heating, strength, and end plate operating stress and connections. The dielectric spacer for storing the energy is 0.020" thick; the operating stress is 15,000 volts per mil or 300,000 volts DC between plates. The number of dielectrics or plates in parallel are 1,116. The average dielectric constant is 8,000. With these values, 112 KWH can be stored in eight cubic feet of space.

$$N = \frac{2' \times 12'' \times 1{,}000 \text{ mils}}{.020'' \text{ dielectric} + .0015'' \text{ Avg. thick plates}}$$

$$= 1{,}116.3 \text{ dielectric spacers}$$
$$\begin{aligned}KWH &= 1{,}229 \times 10^{-20}(300{,}000)^2 \times \\ &\quad 8{,}000 \times (24/2.54)^2 \times 1{,}116.3 \\ &\quad \times 2.54/.02 \\ &= 111.95 \text{ KWH}\end{aligned}$$

The relative densities of the new battery system components are: $SF_6$ at 100 psig=0.3; aluminum=2.7; dielectric material=1.6; crepe paper=0.4; tank and structured items=0.96.

The estimated space for eight (8) cubic feet of energy storage and accessories is 19 cubic feet. The estimated weight is 1,179 pounds at an average density of 1.0. The estimated selling price is $1,769 or $1.50 per pound in mass production.

$$19 FT^3 \times 1 \text{ density avg.} \times 62.4 \#/ft^3 = 1{,}179 \text{ pounds}$$

If the extreme limits of the voltage stress and dielectric constant are reached for an eight cubic feet box, the energy storage would be 466 KWH.

$$\begin{aligned}KWH &= 1.229 \times 10^{-20}(25{,}000 \times \\ &\quad 20)^2 \times 12{,}000 (24/2.54)^2 \\ &\quad \times 1{,}116 (2.54/.02) \\ &= 466.46 \text{ KWH}\end{aligned}$$

If the accessories increased the space 50%, then the KWH per cubic feet are 38.

$$KWH/ft^3 = \frac{466}{8 \times 1.5}$$

$$= 38.83 \text{ KWH}/ft^3$$

The new battery system has the potential for storing electrical energy lower in cost, with reduced weight and reduced space compared to present and future batteries.

The intent of this new system is to have a package system shipped from a plant or assembly shop ready for use.

The complete objectives and construction of this invention will become evident as the drawing is described below. It is understood that many ramifications of this invention will be made in the materials and the construction of the various types of conductors and insulating materials.

BRIEF DESCRIPTION OF THE DRAWING

FIG. 1 is a schematic of the new battery system. Shown are 230 volt input voltage leads on one end of a cylindrical tank and 5 KV DC output leads on the other end.

External controls are shown for energizing the 5 KV output, adjusting the output of the DC voltage and for energizing the system for charging. The non-metallic tank has a conducting inner surface which is grounded for safety.

Inside the tank are switches, externally operated by air pressure controls. The switching contacts are in 100 psig or higher $SF_6$ or an insulating gas, which fills the entire tank. Electrically, the switches are connected to a transformer which are connected to rectifiers, then to condenser plates, and then to high voltage output switches. High voltage output switches are connected to a high resistance for controlling the output voltage. The external output 5 KV leads are connected to the output resistor. One lead is connected through a moveable contact for adjusting output voltage. The moveable contact is operated by a small air motor. Equipment and accessories are supported by insulating materials, attached to the tank, which are made of the same material as the tank.

DESCRIPTION OF THE PREFERRED METHOD

A detailed description of the drawing is now offered. FIG. 1 is a schematic of wiring and components of the new completed factory-built battery system ready for use.

A very high resistor voltage divider 1 is the output for the direct current source contained in enclosure 12, which has inner conductive coating and ground 4. Enclosure 12 is a pressurizable, non-metallic, polymeric, insulating material shaped in a cylinder. 4 is an inside metallic surface of a conductive paint or foil pressed to the surface of the enclosure or tank 12 and an external ground connection.

High voltage direct current switches 2 in tank 12 are externally operated by an internal compressed air tubing 3, external tubing 16, and external controls 17. A tire valve 15 is for charging controls externally with compressed air or nitrogen. An external pressure gauge 14 is for monitoring the pressure. A storage tank 13 is for the compressed gas controls. Switch 2 contacts are opened and closed by compressed air.

The tank 12 is pressurized to 100 psig or higher $SF_6$ or an insulating gas pressure 22 through tire valve 23. Pressure gauge 24 is for measuring tank 12 pressure. Plug and pipe fitting 25 are for vacuuming tank 12.

Air motor 21 in tank 12 is attached to moveable contact 21A. Tubes 3A are for adjusting output voltage by operating motor 21. Seals 16A are for compressed gas tubing 3A, 3, and 3B leaving tank 12. Control panel 17 is for raising and lowering contact 21A by motor 21. 5,000 volts direct current, or lower voltage, insulated cable leads 19B are plastic tubes and conductors for the output of the battery. They are sealed at tank 12 by seals 19A which are plastic welds. Leads 19D are clamped to solid wire leads 19B by clamps 19C and sealed by O-rings 19D. Over-voltage safety gaps 18A are attached to each lead and ground 4.

The electrical energy is stored by condenser plates 5. To calculate the number of plates and the size of the plates for a given capacity battery refer to example which shows 1116 sets of plates which are 2 feet wide and 2 feet long, occupying a space two feet deep. Such an assembly of condenser plates 5, has a storage capacity of 112 KWH of electrical energy. The dielectric constant is 8,000. The voltage stress is 15,000 volts per mil and the thickness of the dielectric is 0.020 inches.

50 KV rectifiers 6 are connected in series for a 200 KV charging voltage.

Transformer 7 is a step-up single winding transformer for boosting 240 volts AC to 150 KV AC.

Air pressurized switches 9 are internal for turning the system on and off after a 230 volts AC supply 10A is connected. Tubings 3B are for controlling air switches 9 by controls on panel 17.

Leads 10 are plastic tubes and conductors 10B are welded at 8 to tank 12. Tubes 10 are clamped to solid wires 10B by clamps 10C and sealed by O-rings 10D.

Many changes and modifications in the abovedescribed embodiment of the invention can of course be carried out without departing from the scope thereof.

I claim:

1. A battery system comprising:
   input conductors with insulation;
   input switches connected in series to said conductors;
   a step-up voltage transformer connected in parallel to said input switches;
   rectifiers connected in series to said transformer to produce a direct current (DC) voltage (DCV);
   a plurality of condenser plates connected in parallel to said rectifiers which are charged to a very high DCV;
   output switches connected in series to said condenser plates;
   an output variable resistor connected in parallel to said condenser plates;
   an enclosure for said conductors, said input and output switches, said transformer, said rectifiers, said condenser plates, said output resistor;
   said enclosure pressurized with an insulating gas; and
   external controls for said switches and said resistor sealed in said enclosure.

2. A battery system according to claim 1, wherein, said switches are opened and closed by compressed air in insulating tubes inside and outside of said enclosure.

3. A battery system according to claim 1, wherein, the dielectric of said condenser plates have a dielectric constant of over 1,000.

4. A battery system according to claim 1, wherein, the operating voltage stress between said condenser plates is over 1,000 volts per thousandths of an inch.

5. A battery system according to claim 1, wherein, the said enclosure is an insulating material, internally shielded and grounded.

6. A battery system according to claim 1, wherein, the said insulating gas is $SF_6$ gas pressurized over 80 psig.

7. A battery system according to claim 1, wherein, said switches are operated externally by compressed air or nitrogen gas.

8. A battery system according to claim 1, wherein, said output voltage is adjustable by an air-operated motor, attached at a moveable contact to said output resistor.

9. A battery system according to claim 1, wherein, the enclosure and tubes for said air-operated switches and motors are a high density and high molecular weight polyethylene material.

* * * * *